US011326729B2

(12) United States Patent
Taguchi et al.

(10) Patent No.: US 11,326,729 B2
(45) Date of Patent: May 10, 2022

(54) SOCKET AND PIPE JOINT INCLUDING THE SAME

(71) Applicant: DAISEN Co., Ltd., Ota (JP)

(72) Inventors: Hiroaki Taguchi, Ora-gun (JP); Toshiharu Horikoshi, Kiryu (JP)

(73) Assignee: DAISEN CO., LTD., Ota (JP)

( * ) Notice: Subject to any disclaimer, the term of this patent is extended or adjusted under 35 U.S.C. 154(b) by 200 days.

(21) Appl. No.: 16/610,016

(22) PCT Filed: Jan. 24, 2019

(86) PCT No.: PCT/JP2019/002331
§ 371 (c)(1),
(2) Date: Nov. 13, 2019

(87) PCT Pub. No.: WO2020/152832
PCT Pub. Date: Jul. 30, 2020

(65) Prior Publication Data
US 2020/0386357 A1    Dec. 10, 2020

(51) Int. Cl.
*F16L 37/38*  (2006.01)
*F16L 37/23*  (2006.01)
(Continued)

(52) U.S. Cl.
CPC ............. *F16L 37/38* (2013.01); *F16L 37/086* (2013.01); *F16L 37/23* (2013.01); *F16L 37/0841* (2013.01)

(58) Field of Classification Search
CPC . F16L 37/23; F16L 37/46; F16L 37/38; F16L 37/086
(Continued)

(56) References Cited

U.S. PATENT DOCUMENTS

| 5,535,985 A | 7/1996 | Larbuisson |
| 5,806,832 A | 9/1998 | Larbuisson |

(Continued)

FOREIGN PATENT DOCUMENTS

| JP | 2000-55272 A | 2/2000 |
| JP | 2000-120964 A | 4/2000 |

(Continued)

OTHER PUBLICATIONS

International Search Report dated Mar. 19, 2019, issued in counterpart International Application No. PCT/JP2019/002331 (10 pages).

(Continued)

*Primary Examiner* — Kevin L Lee
(74) *Attorney, Agent, or Firm* — WHDA, LLP

(57) ABSTRACT

The present invention provides a socket and a pipe joint which facilitate coupling and uncoupling of the socket and a plug and which can prevent the plug from jumping out of the socket in the uncoupling. In a socket 10 of the present invention, fluid in a built-in plug part 22 is released to the outside via communication holes 40 of a second base portion 18 and a through hole 51 of a third base portion 19 in a semi-inserted state. Accordingly, the pressure in a hole portion 34 does not become excessively high and an engaged part 42 is not unexpectedly pushed upward. Thus, an engagement portion 38 and a second engaged portion 26 can surely engage with each other. Hence, the plug 12 can be prevented from jumping out toward the front end side in the semi-inserted state.

3 Claims, 5 Drawing Sheets

(51) Int. Cl.
*F16L 37/086* (2006.01)
*F16L 37/084* (2006.01)

(58) Field of Classification Search
USPC .......... 137/614.03, 614.04; 251/149.1, 149.6
See application file for complete search history.

(56) References Cited

U.S. PATENT DOCUMENTS

| | | | |
|---|---|---|---|
| 5,918,633 A * | 7/1999 | Zeiber | F16L 37/36 |
| | | | 137/614 |
| 7,887,102 B2 | 2/2011 | Tiberghien et al. | |
| 9,464,742 B2 * | 10/2016 | Taguchi | F16L 37/0841 |
| 2004/0094739 A1 | 5/2004 | Lacroix et al. | |
| 2004/0094956 A1 | 5/2004 | Lacroix et al. | |
| 2005/0197000 A1 | 9/2005 | Tiberghien et al. | |
| 2009/0194722 A1 | 8/2009 | Tiberghien et al. | |
| 2015/0145244 A1 | 5/2015 | Taguchi et al. | |

FOREIGN PATENT DOCUMENTS

| | | |
|---|---|---|
| JP | 2004-169918 A | 6/2004 |
| JP | 2005-207591 A | 8/2005 |
| JP | 2008-531947 A | 8/2008 |
| JP | 2015-127585 A | 7/2015 |

OTHER PUBLICATIONS

International Preliminary Report dated Jun. 10, 2019, issued in counterpart International Application No. PCT/JP2019/002331 (8 pages).

Extended (Supplementary) European Search Report dated Jan. 11, 2021, issued in counterpart EP Application No. 19786898.7. (63 pages).

* cited by examiner

SOCKET AND PIPE JOINT INCLUDING THE SAME

TECHNICAL FIELD

The present invention relates to a socket fitted in a passage through which compressed air flows and to a pipe joint including the socket.

BACKGROUND ART

Generally, a socket is provided in an air supply port of an air compressor which supplies compressed air to a nail gun driven by compressed air and a plug is provided in one end portion of a hose which is connected to the socket of the air supply port. Moreover, a socket is provided in the other end portion of the hose and a plug is provided in a portion of a pneumatic tool such as a nail gun which is connected to the socket in the other end portion of the hose and which is driven by the compressed air. Inserting and fixing the sockets to the plugs to connect them allows the compressed air to be supplied from the air supply port of the air compressor to the inside of the hose. The general sockets and plugs are described, for example, in Patent Document 1 listed below.

Moreover, a joint in which a socket and a plug can be uncoupled from each other by manual pressing-down pressure has been developed to facilitate the uncoupling of the socket and the plug (Patent Document 2 and Patent Document 3). In the following description, a pipe joint in which a socket and a plug can be uncoupled from each other by pressing down a predetermined portion is referred to as a press-down type pipe joint.

With reference to FIGS. 3 and [0016] of Patent Document 2, a mechanism is built in a female element and this mechanism has a function of fixing a plug. Specifically, the plug is fixed at a predetermined position in a housing by a spring, a latch, and a drive member provided in the mechanism. Moreover, pressing down the mechanism releases this fixation and the plug and the housing are disconnected from each other.

With reference to FIGS. 1 and [0017] and [0018] of Patent Document 3, a lock is built in a housing portion to be slidable and a plug is fixed to a socket by this lock. Moreover, with reference to FIGS. 7 and [0033] to [0035], moving a member downward allows the plug to be pulled out.

PRIOR ART DOCUMENTS

Patent Documents

Patent Document 1: Japanese Patent Application Publication No. 2000-55272
Patent Document 2: Published Japanese Translation of PCT International Application No. 2008-531947
Patent Document 3: Japanese Patent Application Publication No. 2005-207591

SUMMARY OF THE INVENTION

Problems to be Solved by the Invention

However, in the aforementioned socket members described in Patent Document 2 and Patent Document 3, it is possible that fitting for setting the plug to the inserted state is not easy.

For example, with reference to FIG. 1 of Patent Document 2, the state where the plug is inserted in the socket is achieved by engaging the collar of the plug to the teeth of the socket. However, there is a risk that good engagement with the collar cannot be achieved. Such a problem also applies to the invention described in Patent Document 3.

Moreover, the following case is expected to occur: when the plug is uncoupled from the socket, fluid filled in a downstream portion of a pipe passage blows out from an uncoupling portion between the plug and the socket and the plug and the socket are thereby unexpectedly separated from each other.

The present invention has been made in view of such problems and an object of the present invention is to provide a press-down type socket which facilitates coupling and uncoupling of the socket and a plug and which can prevent the plug from jumping out of the socket in the uncoupling and a pipe joint including the press-down type socket.

Means for Solving the Problems

The socket of the present invention includes: a base portion having a substantially cylindrical shape; a valve element housed in the base portion; a built-in plug part housed in the base portion and having a front end in an axial direction configured to come into contact with the valve element, the built-in plug part provided with an engagement portion protruding toward the outer side in a radial direction; an engaged part housed in a hole portion penetrating the base portion toward the outer side in the radial direction, the engaged part including a first engaged portion configured to engage with the engagement portion in the built-in plug part and a second engaged portion configured to engage with the engagement portion of the built-in plug part at a position different from the first engaged portion; a plurality of steel balls housed in housing holes provided to penetrate the built-in plug part in the radial direction; a built-in base portion which is built in the base portion and in which the built-in plug part is inserted; an O-ring arranged between the built-in base portion and the built-in plug part; and a communication hole formed to penetrate the built-in base portion and causing a space in the built-in base portion and the hole portion of the base portion to communicate with each other, wherein the socket is capable of being set to an inserted state in which a plug is inserted in the socket in an airtight state, a semi-inserted state in which the plug engages with the socket in a non-airtight state, and a non-inserted state in which the plug is capable of being pulled out, in the inserted state, the plug is partially inserted in the built-in plug part, the engagement portion of the plug engages with the steel balls pushed out toward the inner side in the radial direction, and the engagement portion of the built-in plug part engages with the first engaged portion of the engaged part, in the semi-inserted state, the engagement portion of the built-in plug part disengaged from the first engaged portion by pressing of the engaged part toward the inner side in the radial direction moves to engage with the second engaged portion, in the non-inserted state, after the pressing of the engaged part is canceled, the engagement portion of the built-in plug part and the second engaged portion are disengaged from each other, the built-in plug part moves, the steel balls move toward the outer side in the radial direction, and the steel balls and the engagement portion of the plug are disengaged from each other, and in the semi-inserted state, fluid in the built-in plug part is released to outside via the communication hole of the built-in base portion.

Moreover, in the socket of the present invention, the O-ring is fitted to a recess-shaped groove formed by depressing an inner peripheral surface of the built-in base portion toward the outer side in the radial direction.

Moreover, a pipe joint of the present invention includes the socket and the plug configured to be fitted to the socket.

Effects of the Invention

The socket of the present invention includes: a base portion having a substantially cylindrical shape; a valve element housed in the base portion; a built-in plug part housed in the base portion and having a front end in an axial direction configured to come into contact with the valve element, the built-in plug part provided with an engagement portion protruding toward the outer side in a radial direction; an engaged part housed in a hole portion penetrating the base portion toward the outer side in the radial direction, the engaged part including a first engaged portion configured to engage with the engagement portion in the built-in plug part and a second engaged portion configured to engage with the engagement portion of the built-in plug part at a position different from the first engaged portion; a plurality of steel balls housed in housing holes provided to penetrate the built-in plug part in the radial direction; a built-in base portion which is built in the base portion and in which the built-in plug part is inserted; an O-ring arranged between the built-in base portion and the built-in plug part; and a communication hole formed to penetrate the built-in base portion and causing a space in the built-in base portion and the hole portion of the base portion to communicate with each other, wherein the socket is capable of being set to an inserted state in which a plug is inserted in the socket in an airtight state, a semi-inserted state in which the plug engages with the socket in a non-airtight state, and a non-inserted state in which the plug is capable of being pulled out, in the inserted state, the plug is partially inserted in the built-in plug part, the engagement portion of the plug engages with the steel balls pushed out toward the inner side in the radial direction, and the engagement portion of the built-in plug part engages with the first engaged portion of the engaged part, in the semi-inserted state, the engagement portion of the built-in plug part disengaged from the first engaged portion by pressing of the engaged part toward the inner side in the radial direction moves to engage with the second engaged portion, in the non-inserted state, after the pressing of the engaged part is canceled, the engagement portion of the built-in plug part and the second engaged portion are disengaged from each other, the built-in plug part moves, the steel balls move toward the outer side in the radial direction, and the steel balls and the engagement portion of the plug are disengaged from each other, and in the semi-inserted state, fluid in the built-in plug part is released to outside via the communication hole of the built-in base portion. In the socket of the present invention, the O-ring thus seals a gap between the built-in base portion and the built-in plug part in the semi-inserted state. Accordingly, the fluid in the built-in plug is released to the outside via the communication hole of the built-in base portion and the hole portion of the base portion and the pressure of the fluid can be thus quickly reduced. Thus, in the semi-inserted state, it is possible to prevent the pressure from unexpectedly moving the engaged part toward the outer side in the radial direction and cause the engagement portion of the built-in plug part to surely engage with the second engaged portion. Hence, the case where the plug is unexpectedly uncoupled from the socket in the semi-inserted state can be suppressed.

Moreover, in the socket of the present invention, the O-ring is fitted to a recess-shaped groove formed by depressing an inner peripheral surface of the built-in base portion toward the outer side in the radial direction. In the socket of the invention of the present application, the O-ring can be thus surely held in the built-in base portion.

Furthermore, the pipe joint of the present invention includes the socket and the plug configured to be fitted to the socket. In the pipe joint of the invention of the present application, the case where the plug is unexpectedly uncoupled from the socket in the semi-inserted state can be thus suppressed.

BRIEF DESCRIPTION OF THE DRAWINGS

FIG. 1A is a perspective view illustrating a pipe joint, and FIG. 1B is an exploded perspective view illustrating the disassembled pipe joint.

FIG. 3A is a side view illustrating the pipe joint in an inserted state, and FIG. 3B is a cross-sectional view.

FIG. 4A is a side view illustrating the pipe joint in a semi-inserted state, and FIG. 4B is a cross-sectional view.

FIG. 5 is a side view illustrating the pipe joint in a non-inserted state, and FIG. 5B is a cross-sectional view.

MODES FOR CARRYING OUT THE INVENTION

Figure 1:
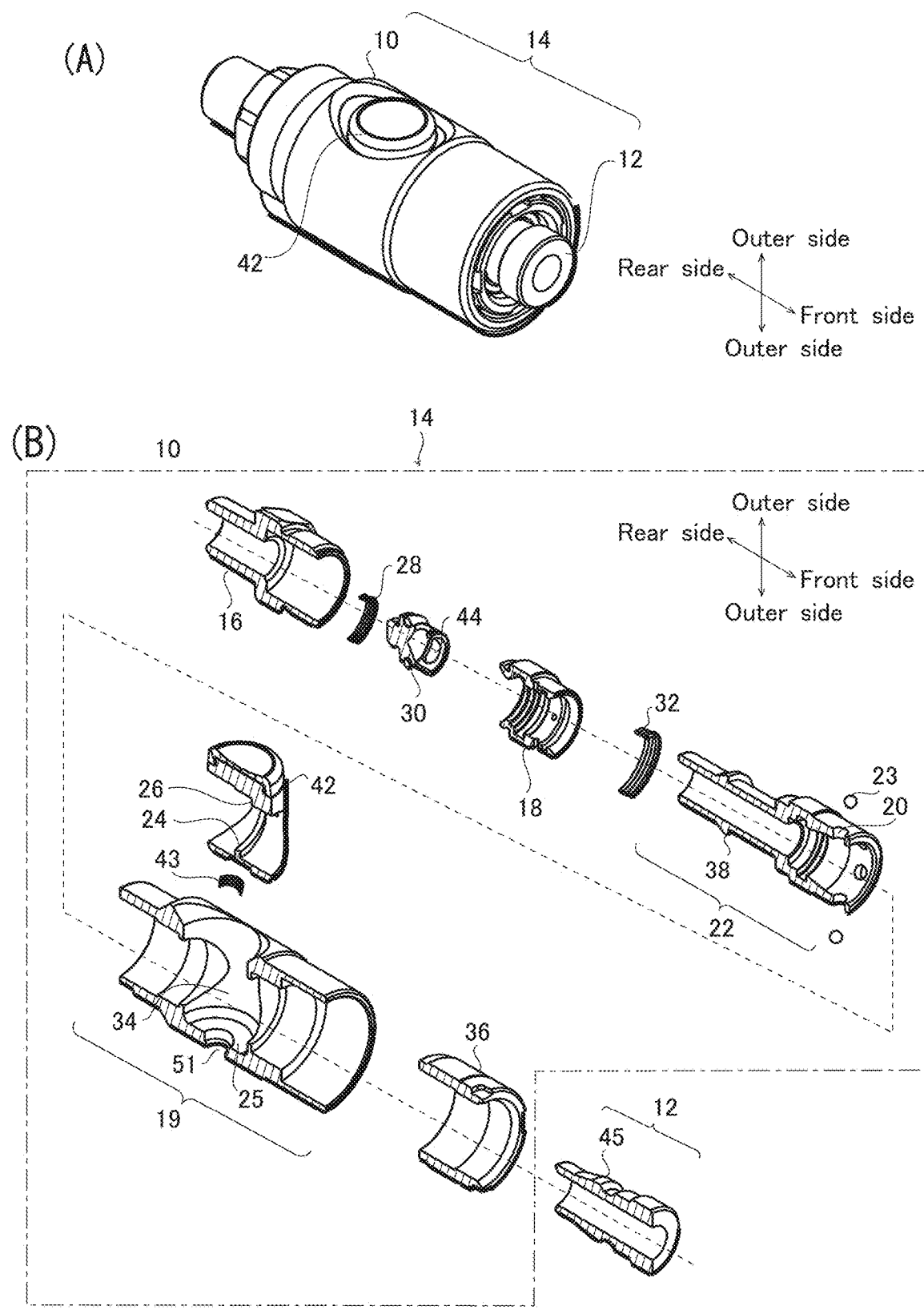
FIGS. 1A and 1B are views illustrating a socket and a pipe joint in the present invention.

A configuration of a pipe joint 14 according to an embodiment is described with reference to FIGS. 1A and 1B. FIG. 1A is a perspective view illustrating the pipe joint 14 in a state where a plug 12 is inserted in a socket 10 and FIG. 1B is an exploded cutaway perspective view illustrating the disassembled pipe joint 14.

The pipe joint 14 includes the socket 10 and the plug 12 and is formed by inserting the plug 12 into the socket 10. Moreover, the pipe joint 14 in the embodiment is a press-down type pipe joint in which the plug 12 and the socket 10 are disconnected from each other by pressing an engaged part 42 downward.

A role of the pipe joint 14 is to enable coupling and uncoupling of a hose connecting a compressed air generation device such as a compressor and a compressed air usage device such as a nail gun to each other by being installed on the hose. In usage, the compressed air flows from the socket 10 toward the plug 12. In this description, the plug 12 is sometimes referred to as a male joint member and the socket 10 is sometimes referred to as a female joint member.

In the following description, the side on which the plug 12 is arranged in the entire socket 10 is referred to as a front end side and the opposite side to the front side is referred to as a rear end side. Moreover, the outer side in the circumferential direction is referred to as an outer side and the inner side in the circumferential direction is referred to as an inner side. Furthermore, the side on which the engaged part 42 is arranged is referred to as an upper side and the opposite side to the upper side is referred to as a lower side.

States of the pipe joint 14 include an inserted state in which the plug 12 is inserted in the socket 10 in an airtight state, a semi-inserted state in which the socket 10 and the plug 12 engage with each other in an non-airtight state, and a non-inserted state in which the plug 12 can be pulled out from the socket 10. FIG. 1A illustrates the inserted state in which the plug 12 is inserted and fitted in the socket 10. The semi-inserted state is also referred to as a purged state.

A method of transitioning the pipe joint 14 from the non-inserted state to the inserted state is as follows. When the plug 12 is inserted into the socket 10, a distal end portion of the plug 12 is inserted and fitted into a built-in plug part 22 to be described later which is built in the socket 10. At the same time, a predetermined portion of the built-in plug part 22 engages with the engaged part 42. Details of the inserted state are described in detail with reference to FIGS. 3A and 3B.

When a user presses down the engaged part 42 with the finger or the like in the inserted state and keeps pressing down the engaged part 42, the pipe joint 14 is set to the semi-inserted state. Specifically, the built-in plug part 22 built in the socket 10 engages in a state where the built-in plug part 22 is moved toward the front end side. Moreover, the engagement between the built-in plug part 22 and the plug 12 is maintained in this state. Details of the semi-inserted state are described in detail with reference to FIGS. 4A and 4B.

Then, when the pressing down of the engaged part 42 by the user is canceled, the pipe joint 14 is set to the non-inserted state. Specifically, the engaged part 42 and the built-in plug part 22 to be described later which is built in the socket 10 are disengaged from each other and the built-in plug part 22 and the plug 12 are disengaged from each other. Details of the non-inserted state are described in detail with reference to FIGS. 5A and 5B.

With reference to FIG. 1B, a base portion housing the built-in plug part 22 and the like is formed by combining a first base portion 16, a second base portion 18, a third base portion 19, and a fourth base portion 36 in this order from the rear end side. A valve element 30 and a spring 28 are housed in the first base portion 16 and the second base portion 18.

A base portion described in the claims is the third base portion 19 and a built-in base portion in the claims is the second base portion 18.

The engaged part 42 which defines the position of the built-in plug part 22 is housed in a hole portion 34 penetrating the third base portion 19 to the upper side. A first engaged portion 24 and a second engaged portion 26 are arranged on an inner surface of the engaged part 42 and these portions engage with an engagement portion 38 of the built-in plug part 22. A spring 43 is housed in a recess portion 25 provided in a bottom portion of the hole portion 34 and applies upward biasing force to the engaged part 42. Moreover, a through hole 51 penetrating the recess portion 25 is formed.

A spring 32 and the built-in plug part 22 are built in the third base portion 19 and the fourth base portion 36 on the front end side of the hole portion 34, in this order from the front end side. The spring 32 applies biasing force toward the front end side to the built-in plug part 22.

The built-in plug part 22 has the role of defining the positions of the plug 12 and the socket 10 relative to each other by engaging with one of the engagement portions of the engaged part 42 in the inserted state or the semi-inserted state described above. Housing holes 20 provided by penetrating the built-in plug part 22 in the thickness direction in a circular shape are formed near an end portion of the built-in plug part 22 on the front end side and steel balls 23 are housed in the housing holes 20. The steel balls 23 have a function of achieving fitting between the plug 12 and the built-in plug part 22.

The plug 12 has an engagement portion 45 formed by increasing the diameter near the rear end portion and, when the plug 12 is inserted into the socket 10, the engagement portion 45 is fitted to the built-in plug part 22 via the steel balls 23. In the embodiment, both side surfaces in a cross section of the engagement portion 45 have a shape spreading toward the inner side in a radial direction, that is a substantially trapezoidal shape.

Moreover, an O-ring obtained by shaping a soft resin material in a ring shape is interposed in a portion where portions forming the pipe joint 14 come into contact with each other.

Figure 2:
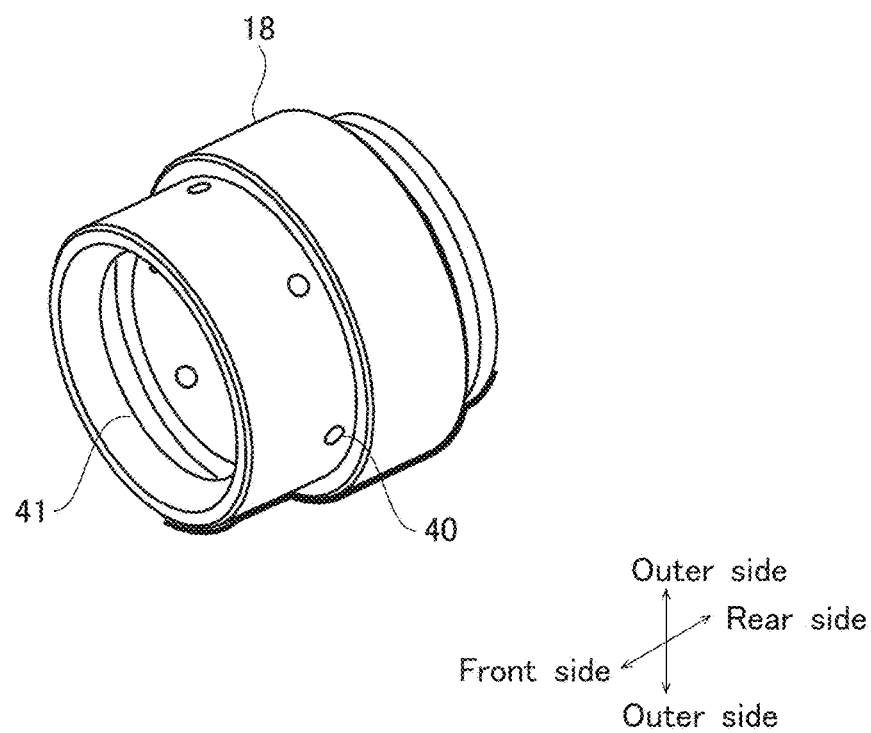
FIG. 2 is a view illustrating the socket and the pipe joint in the present invention and is a perspective view illustrating a second base portion.

A configuration of the second base portion 18 is described with reference to FIG. 2. As illustrated in FIG. 1B, the second base portion 18 is a substantially tubular portion arranged between the valve element 30 and the built-in plug part 22. The air-tightness of a flow path inside the built-in plug part 22 is secured by the second base portion 18.

An inner surface of the second base portion 18 on the front end side is depressed toward the outer side in the radial direction in a groove shape to form a housing groove 41. An O-ring 52 to be described later is housed in the housing groove 41. The O-ring 52 housed in the housing groove 41 is a portion which prevents the plug 12 from being uncoupled in the semi-inserted state illustrated in FIGS. 4A and 4B.

Communication holes 40 are formed by penetrating portions of the second base portion 18 on the rear end side of the housing groove 41. Multiple communication holes 40 are formed at substantially equal intervals in the circumferential direction of the second base portion 18. The communication holes 40 are portions for preventing the plug 12 from being uncoupled in the semi-inserted state illustrated in FIGS. 4A and 4B.

Figure 3A:
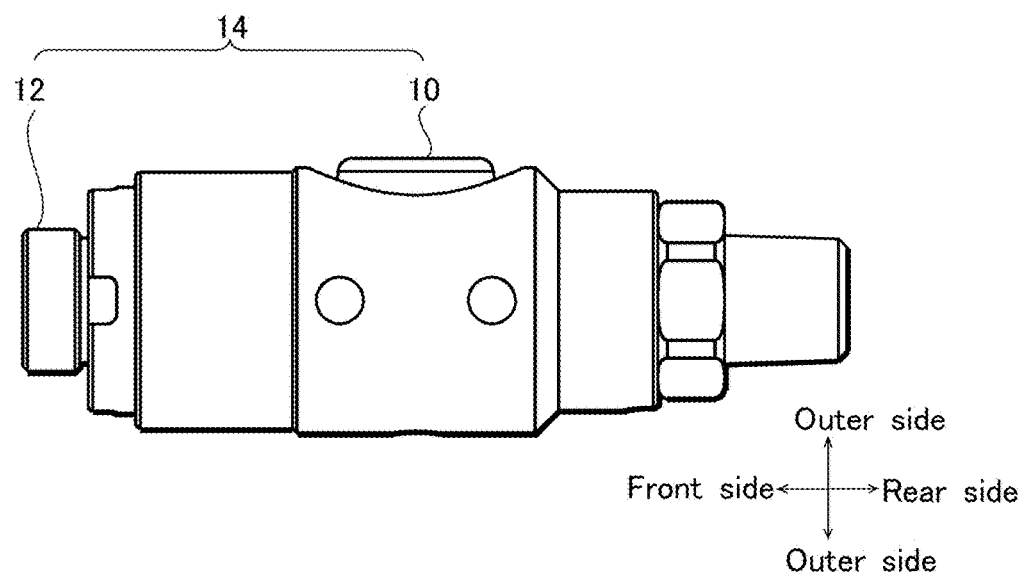
FIGS. 3A and 3B are views illustrating the socket and the pipe joint in the present invention.
Figure 3B:
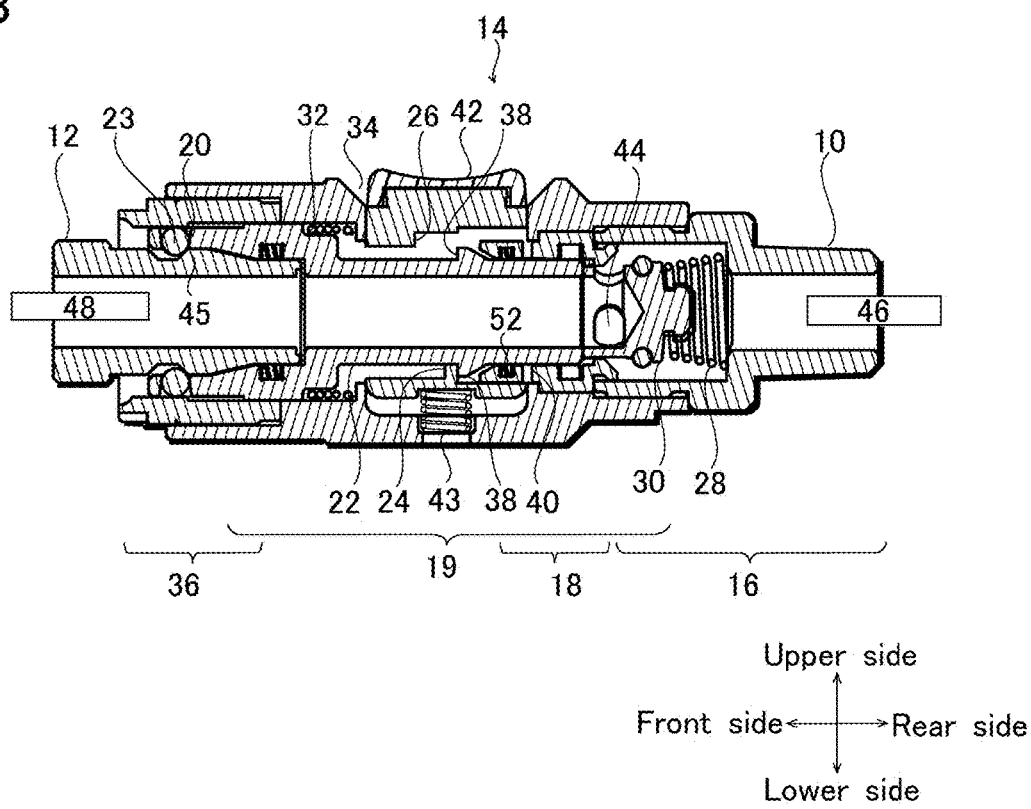

A configuration of the pipe joint 14 in the inserted state is described with reference to FIGS. 3A and 3B. FIG. 3A is a side view illustrating the pipe joint 14 in the state where the plug 12 is inserted in the socket 10. FIG. 3B is a cross-sectional view of FIG. 3A.

Configurations relating to the base portions are described with reference to FIG. 3B. A portion around the front end of the first base portion 16 arranged on the rear end side is inserted and fixed to the third base portion 19. This insertion and fixation is achieved by fastening using a screw structure, adhesion using adhesive, or a combination of these. This matter applies similarly to other members forming the socket 10.

The second base portion 18 is built in a rear end portion of the third base portion 19 and an end portion of the second base portion 18 on the rear end side is in contact with the first base portion 16. The inner diameter of the second base portion 18 is substantially the same as the outer diameter of the built-in plug part 22 on the rear end side.

The fourth base portion 36 is built in a front end portion of the third base portion 19 and the inner diameter of the third base portion 19 on the front end side is substantially the same as the outer diameter of the built-in plug part 22 on the rear end side. These base portions are made of metal material.

The spring 28 and the valve element 30 are built in the first base portion 16. An end portion of the spring 28 on the rear end side comes into contact with a wall-shaped portion provided in the first base portion 16 and an end portion of the spring 28 on the front end side comes into contact with the valve element 30. The spring 28 applies biasing force toward the front end side to the valve element 30.

The valve element 30 has a bottomed cylindrical shape with an opening port on the front end side. In the inserted state illustrated in FIGS. 3A and 3B, the valve element 30 is pressed by the built-in plug part 22 toward the rear end side and a gap through which fluid flows is formed between the valve element 30 and the second base portion 18. Multiple hole portions 44 penetrating a side wall of the valve element 30 are provided at equal intervals in the circumferential direction and an air flow passage 46 on the socket 10 side and an air flow passage 48 on the plug 12 side communicate with each other via the hole portions 44.

The built-in plug part 22 is built in the third base portion 19. The built-in plug part 22 is a member which has a function of being fitted to the plug 12 and engaging with the engaged part 42 in the inserted state and the semi-inserted state. In other words, the built-in plug part 22 is a member provided between the plug 12 and the engaged part 42 and link both parts to each other. The built-in plug part 22 has such a specific shape that the end portion on the front end side has a substantially-cylindrical shape with a larger diameter than the rear end side, and has the engagement portion 38 obtained by increasing the periphery of the built-in plug part 22 in an annular shape. The side surface of the engagement portion 38 on the rear end side is a tilted surface and a side surface thereof on the front end side is a surface perpendicular to an axial direction.

The housing holes 20 penetrating the portion near the end portion of the built-in plug part 22 on the front end side are formed and the steel balls 23 are housed in the housing holes 20. In the inserted state, the steel balls 23 pushed out toward the inner side by coming into contact with an inner wall of the fourth base portion 36 engage with a front end side surface of the engagement portion 45 in the plug 12. Fitting between the built-in plug part 22 and the plug 12 is thereby achieved.

The engagement between the engaged part 42 and the built-in plug part 22 is described. The engaged part 42 is housed in the hole portion 34 provided to penetrate the third base portion 19 to the upper side in a circular shape. The outer shape of the engaged part 42 is a substantially cylindrical shape with a center axis extending in an up-down direction. The engaged part 42 is provided with a through hole extending in the axial direction and the built-in plug part 22 is arranged in the through hole. The first engaged portion 24 is formed on the inner wall of the engaged part 42 on the rear end side and the second engaged portion 26 is formed on the inner wall of the engaged part 42 on the front end side.

The first engaged portion 24 is a portion formed by causing the inner surface of the engaged part 42 to protrude toward the inner side in the radial direction, that is upward in this case. A side surface of the first engaged portion 24 on the rear end side is a surface perpendicular to the axial direction and, in the inserted state, the side surface of the engagement portion 38, included in the built-in plug part 22, on the front end side comes into contact with a side surface of the first engaged portion 24 on the front end side. Moreover, upward biasing of the engaged part 42 by the spring 43 causes the first engaged portion 24 and the engagement portion 38 of the built-in plug part 22 to engage with each other. The position of the built-in plug part 22 in the socket 10 is thereby defined in the front-rear direction.

Meanwhile, in this state, the second engaged portion 26 of the engaged part 42 is out of contact with the engagement portion 38.

The pipe joint 14 is used in the aforementioned inserted state. Specifically, the compressed air generated by the compressed air generation device arranged outside is introduced into the pipe joint 14 from the rear end side and is supplied to the compressed air usage device such as a nail gun via, the air flow passage 46, the hole portions 44 of the valve element 30, and the air flow passage 48.

Figure 4A:
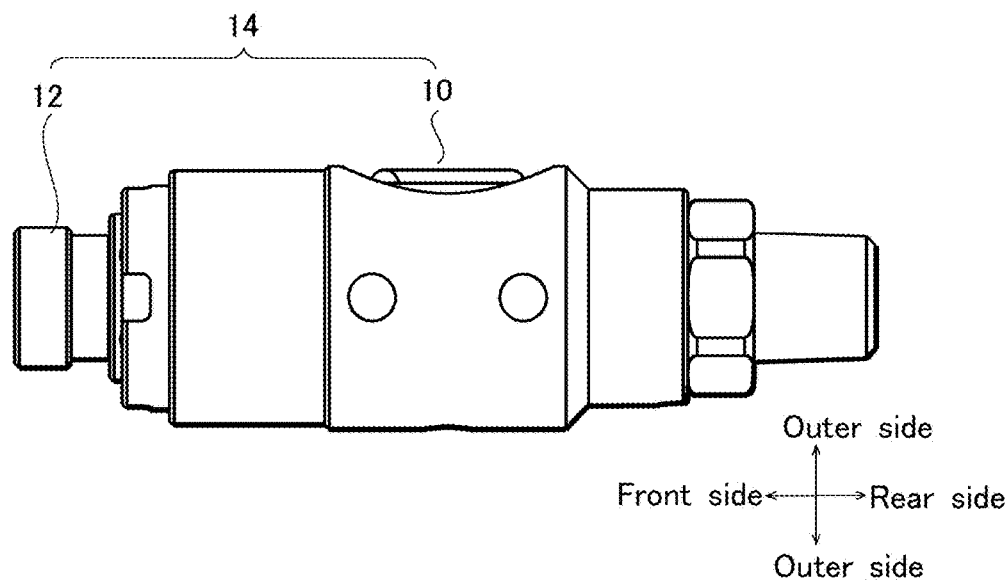
FIGS. 4A and 4B are views illustrating the socket and the pipe joint in the present invention.

A configuration of the pipe joint 14 in the semi-inserted state is described with reference to FIGS. 4A and 4B. FIG. 4A is a plan view illustrating the pipe joint 14 in this state and FIG. 3B is a cross-sectional view of the pipe joint 14.

With reference to FIG. 4A, when the user presses down the engaged part 42 of the socket 10 in the aforementioned inserted state and keeps pressing down the engaged part 42, the plug 12 is pushed out from the socket 10 toward the front end side by about several millimeters and is held at that position. This state is the semi-inserted state (purged state) in which the air-tight state between the plug 12 and the socket 10 is canceled with the engagement therebetween maintained.

A configuration of the pipe joint 14 in the semi-inserted state is described in detail with reference to FIG. 4B. When the user presses down the engaged part 42, the engaged part 42 moves downward while the spring 43 is compressed. Meanwhile, the position of the engagement portion 38 of the built-in plug part 22 does not change in the up-down direction. Accordingly, the engagement portion 38 of the built-in plug part 22 is uncoupled from the first engaged portion 24. As a result, the built-in plug part 22 is moved toward the front end side by the biasing force of the spring 28 and the spring 32. Thereafter, the side surface of the second engaged portion 26 on the rear end side in the engaged part 42 engages with the side surface of the engagement portion 38 on the front end side in the built-in plug part 22. The position of the built-in plug part 22 in the socket 10 in the semi-inserted state is thereby fixed. In this period, the engaged part 42 is kept being pressed from above.

The valve element 30 biased toward the rear end side by the spring 28 is also moved with the movement of the built-in plug part 22. The valve element 30 and the second base portion 18 come into contact with each other via an O-ring attached to the valve element 30. The air flow passage 46 and the air flow passage 48 are thereby isolated from each other in the socket 10. Accordingly, even when the airtight state is canceled on the front end side of the second base portion 18, the compressed air supplied from the compressor connected to the socket 10 does not leak outside.

Moreover, the plug 12 is also moved toward the front end side. In this case, since the steel balls 23 are in contact with the inner wall of the fourth base portion 36 and are thus maintained to be pressed outward toward the inner side, the engagement portion 45 of the plug 12 remains to be engaged with the steel balls 23. Accordingly, the plug 12 remains to be fitted to the built-in plug part 22 in the semi-inserted state and is not uncoupled from the socket 10 due to internal pressure in this state.

Figure 4B:
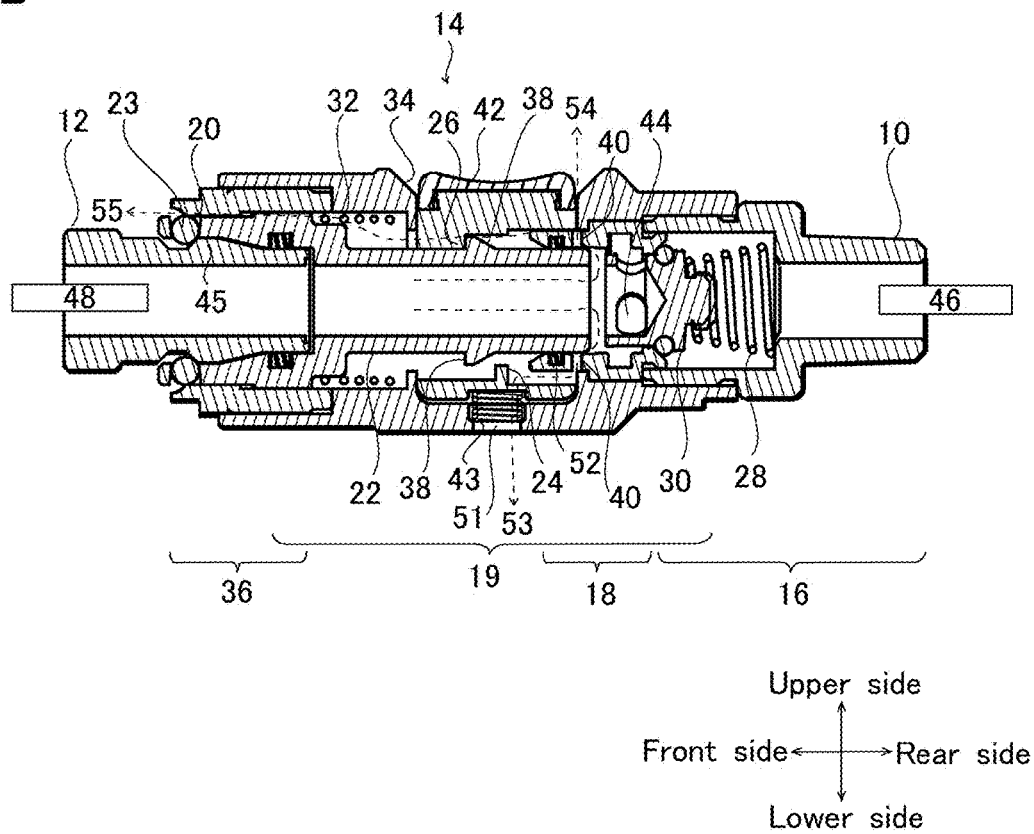

Furthermore, in the semi-inserted state illustrated in FIG. 4B, the engagement portion 38 is made to be surely in contact with the second engaged portion 26 by providing a route which allows fluid on the air flow passage 48 to escape to the outside.

Specifically, in the semi-inserted state, the air flow passage 48 and the air flow passage 46 are set to the non-airtight state and the compressed air filled in the air flow passage 48 is released to the hole portion 34 from a gap between the built-in plug part 22 and the valve element 30. Accordingly, the pressure inside the hole portion 34 increases and there is a risk that the increased pressure pushes the engaged part 42 upward and prevents the engagement portion 38 and the second engaged portion 26 from engaging with each other, thereby causing the plug 12 to jump out toward the front end side.

In the embodiment, the O-ring 52 is arranged on the inner surface of the valve element 30. The O-ring 52 is compressed between the inner surface of the second base portion 18 and the outer surface of the built-in plug part 22 and seals the gap therebetween. This can prevent the compressed air from flowing into the hole portion 34 via a gap between the inner surface of the second base portion 18 and the outer surface of the built-in plug part 22.

Furthermore, the communication holes 40 are formed in the second base portion 18. The communication holes 40 are arranged on the front end side of the front end of the first base portion 16. Moreover, the communication holes 40 communicate with the hole portion 34. Accordingly, in the semi-inserted state, the compressed air filled in the air flow passage 48 is released to the outside of the socket 10 by following a route 53 illustrated by a dotted line in FIG. 4B. Specifically, in the route 53, the compressed air filled in the air flow passage 48 is released to the outside of the socket 10 via the gap between the built-in plug part 22 and the valve element 30, the communication holes 40, the hole portion 34, and the through hole 51. This prevents the pressure in the hole portion 34 from becoming excessively high and prevents the engaged part 42 from being unexpectedly pushed upward. Accordingly, the engagement portion 38 and the second engaged portion 26 can surely engage with each other. Thus, it is possible to prevent the plug 12 from jumping out toward the front end side in the semi-inserted state.

Moreover, in the semi-inserted state, the compressed air in the air flow passage 48 is released to the outside via a route 54 and a route 55. In the route 54, the compressed air is released from the inside of the built-in plug part 22 to the outside via the communication holes 40 and a gap between the hole portion 34 and the engaged part 42. In the route 55, the air in the built-in plug part 22 is released to the outside via the communication holes 40, the hole portion 34, a gap between the third base portion 19 and the built-in plug part 22, and a gap between the fourth base portion 36 and the built-in plug part 22. Discharging the compressed air from the inside of the built-in plug part 22 to the outside via multiple routes as described above suppresses an abrupt increase in pressure in the hole portion 34 and prevents the engaged part 42 from being unexpectedly moved upward and being disengaged from the built-in plug part 22.

Figure 5A:
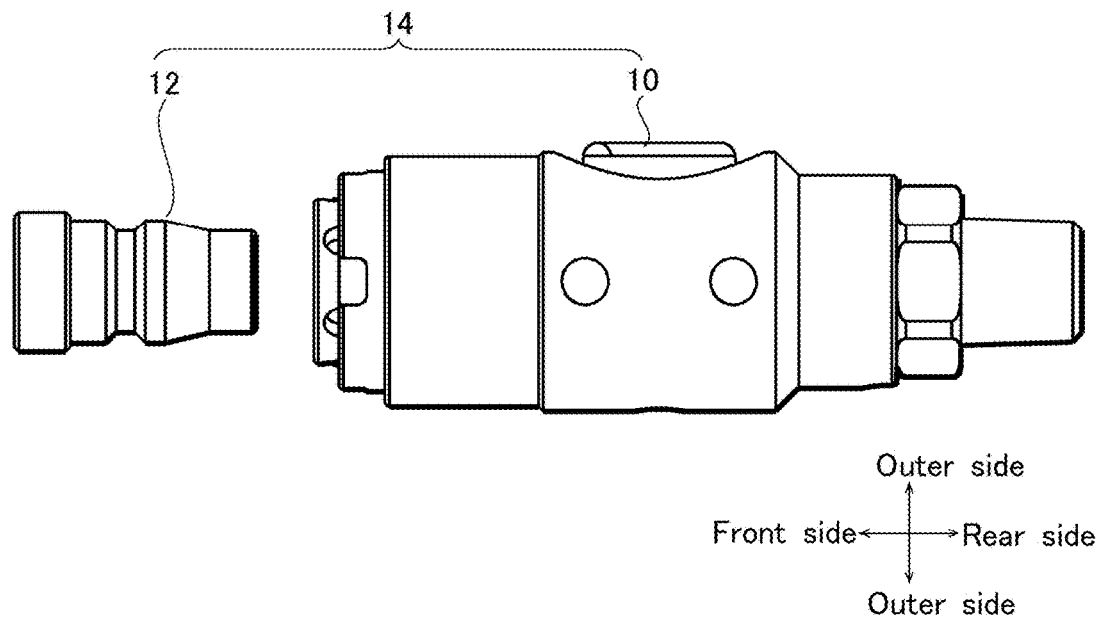
FIGS. 5A and 5B are views illustrating the socket and the pipe joint in the present invention.

Next, the unconnected state in which the plug 12 is pulled out from the socket 10 is described with reference to FIGS. 5A and 5B. FIG. 5A is a plan view illustrating the pipe joint 14 in the unconnected state and FIG. 5B is a cross-sectional view of the pipe joint 14.

With reference to FIG. 5A, when the pressing force applied to the engaged part 42 is canceled after the aforementioned semi-inserted state, the plug 12 and the socket 10 are disconnected from each other and the plug 12 is uncoupled.

Figure 5B:
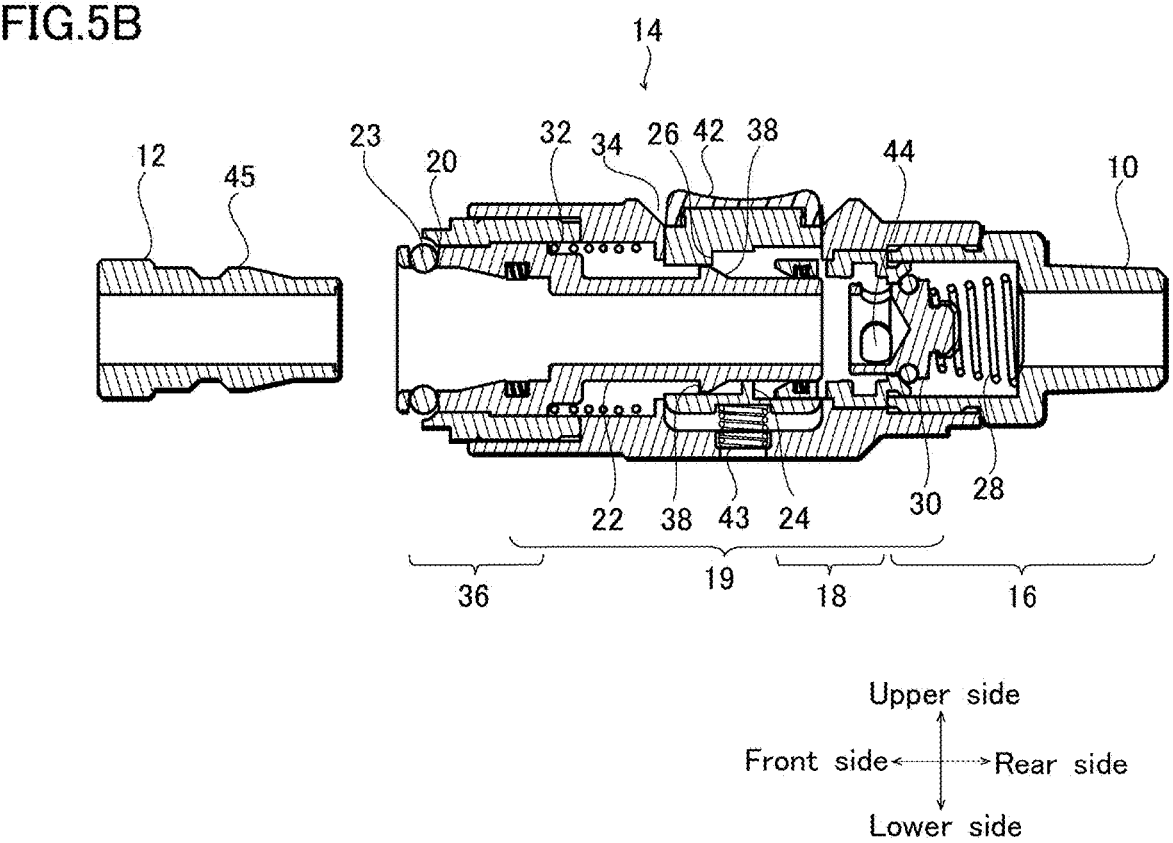

With reference to FIG. 5B, specifically, when the pressing force applied to the engaged part 42 is canceled, the engaged part 42 is moved upward by the biasing force of the spring 43. As a result, the engagement portion 38 of the built-in plug part 22 and the second engaged portion 26 are disengaged from each other. Then, the built-in plug part 22 is moved toward the front end side by the biasing force of the spring 32. After the movement, an upper surface (outer end portion) of the engagement portion 38 in the built-in plug part 22 comes into contact with a lower surface of the second engaged portion 26 in the engaged part 42.

The steel balls 23 housed in the housing holes 20 move toward the outer side in the radial direction with the movement of the built-in plug part 22. The engagement portion 45 of the plug 12 and the steel balls 23 are thereby disengaged from each other and the plug 12 can be pulled out from the socket 10.

That is the structures and operations of the pipe joint 14 in the inserted state, the semi-inserted state, and the non-inserted state.

DESCRIPTION OF REFERENCE NUMERALS 10 socket
12 plug
14 pipe joint
16 first base portion
18 second base portion
19 third base portion
20 housing hole
22 built-in plug part
23 steel ball
24 first engaged portion
25 recess portion
26 second engaged portion
28 spring
30 valve element
32 spring
34 hole portion
36 fourth base portion
38 engagement portion
40 communication hole
41 housing groove
42 engaged part
43 spring
44 hole portion
45 engagement portion
46 air flow passage
48 air flow passage
51 through hole
52 O-ring
53 route
54 route
55 route

The invention claimed is:

1. A socket comprising:
a base portion having a substantially cylindrical shape;
a valve element housed in the base portion;
a built-in plug part housed in the base portion and having
 a front end in an axial direction configured to come into contact with the valve element, the built-in plug part provided with an engagement portion protruding outward in a radial direction;
an engaged part housed in a hole portion penetrating the base portion toward an outer side in the radial direction, the engaged part including a first engaged portion configured to engage with the engagement portion in the built-in plug part and a second engaged portion configured to engage with the engagement portion of the built-in plug part at a position different from the first engaged portion;

a plurality of steel balls housed in housing holes provided to penetrate the built-in plug part in the radial direction;

a built-in base portion which is built in the base portion and into which the built-in plug part is inserted;

an O-ring arranged between the built-in base portion and the built-in plug part; and a communication hole formed to penetrate the built-in base portion and causing a space in the built-in base portion and the hole portion of the base portion to communicate with each other, wherein the O-ring is arranged downstream of the communication hole along a flow of fluid in an axial direction of the base portion, the socket is capable of being set to an inserted state in which a plug is inserted in the socket in an airtight state, a semi-inserted state in which the plug engages with the socket in a non-airtight state, and a non-inserted state in which the plug is pulled out of the socket, in the inserted state, the plug is partially inserted in the built-in plug part, an engagement portion of the plug engages with the steel balls pushed out toward an inner side in the radial direction, and the engagement portion of the built-in plug part engages with the first engaged portion of the engaged part, in the semi-inserted state, the engagement portion of the built-in plug part disengaged from the first engaged portion by pressing of the engaged part toward the inner side in the radial direction moves to engage with the second engaged portion, in the non-inserted state, after the pressing of the engaged part is canceled, the engagement portion of the built-in plug part and the second engaged portion are disengaged from each other, the built-in plug part moves, the steel balls move toward an outer side in the radial direction, and the steel balls and the engagement portion of the plug are disengaged from each other, and in the semi-inserted state, the fluid in the built-in plug part is released to outside via the communication hole of the built-in base portion with the O-ring arranged between an inner surface of the built-in base portion and an outer surface of the built-in plug portion.

2. The socket according to claim 1, wherein the O-ring is fitted to a recess-shaped groove formed by depressing an inner peripheral surface of the built-in base portion toward the outer side in the radial direction.

3. A pipe joint comprising:
the socket according to claim 1, wherein
the plug configured to be fitted to the socket.

* * * * *